(12) United States Patent
Hu et al.

(10) Patent No.: US 11,789,034 B1
(45) Date of Patent: Oct. 17, 2023

(54) INTELLIGENT SOFT MEASUREMENT METHOD FOR WIND SPEED IN FRONT OF WIND TURBINE

(71) Applicants: North China Electric Power University, Beijing (CN); Huaneng Group Technology Innovation Center Co., Ltd, Beijing (CN)

(72) Inventors: Yang Hu, Beijing (CN); Fang Fang, Beijing (CN); Siqi Chen, Beijing (CN); Jizhen Liu, Beijing (CN); Xiaojiang Guo, Beijing (CN); Qinghua Wang, Beijing (CN)

(73) Assignees: NORTH CHINA ELECTRIC POWER UNIVERSITY, Beijing (CN); HUANENG GROUP TECHNOLOGY INNOVATION CENTER CO., LTD, Beijing (CN)

( * ) Notice: Subject to any disclaimer, the term of this patent is extended or adjusted under 35 U.S.C. 154(b) by 0 days.

(21) Appl. No.: 18/126,027

(22) Filed: Mar. 24, 2023

(30) Foreign Application Priority Data

Jul. 6, 2022 (CN) .......................... 202210796431.8

(51) Int. Cl.
  *G01P 5/26* (2006.01)
  *G01S 17/58* (2006.01)
  *G01S 17/95* (2006.01)

(52) U.S. Cl.
  CPC .............. *G01P 5/26* (2013.01); *G01S 17/58* (2013.01); *G01S 17/95* (2013.01)

(58) Field of Classification Search
  CPC .............. G01P 5/26; G01S 17/58; G01S 17/95
  USPC ............................................................. 702/3
  See application file for complete search history.

(56) References Cited

U.S. PATENT DOCUMENTS 10,803,758 B1 * 10/2020 Barr ..................... G08G 5/0013

FOREIGN PATENT DOCUMENTS

| CN | 104653410 A | 5/2015 |
|---|---|---|
| CN | 111120205 A | 5/2020 |
| EP | 2 876 302 A1 | 5/2015 |
| EP | 3 97 4646 A1 | 3/2022 |
| JP | 2020-153347 A | 9/2020 |
| TW | 202035860 A | 10/2020 |

* cited by examiner

*Primary Examiner* — Aditya S Bhat
(74) *Attorney, Agent, or Firm* — Muncy, Geissler, Olds & Lowe, P.C.

(57) ABSTRACT

The present invention discloses an intelligent soft measurement method for wind speed in front of a wind turbine. The method includes: first using laser radar data as a data sample, judging delay orders between input and output by using an AIC or BIC criterion, defining a dynamic difference regression vector according to the delay orders, dividing hyperplanes according to a clustering result by using a machine learning algorithm, and performing dynamic differential input/output nonlinear mapping modeling in a global scope and sub-scopes by using an artificial intelligence dynamic regression algorithm, respectively. Empirical mode decomposition and power spectral density analysis are performed on the wind speed in front of a laser radar measuring machine and the wind speed in front of a soft measurement machine, thereby further verifying the estimation performance of intelligent soft measurement for the wind speed in front of a wind turbine.

6 Claims, 9 Drawing Sheets

```
┌─────────────────────────────────────────────────────────────────────┐
│ Select a wind turbine, set a sampling period, and acquire measured  │
│ operation data of the wind turbine by using an airborne or ground   │
│ laser radar system                                                   │
└─────────────────────────────────────────────────────────────────────┘
                                  ↓
┌─────────────────────────────────────────────────────────────────────┐
│ Select, according to aerodynamic characteristic mechanism analysis  │
│ of the wind turbine, variables such as the wind speed measured by   │
│ the nacelle anemometer as model input variables, and the wind speed │
│ in front of the wind turbine as a model output variable             │
└─────────────────────────────────────────────────────────────────────┘
                                  ↓
┌─────────────────────────────────────────────────────────────────────┐
│ Analyze the correlation between each input variable and output      │
│ variable on the basis of a nonlinear feature selection algorithm,   │
│ and finally determine an input feature variable                     │
└─────────────────────────────────────────────────────────────────────┘
                                  ↓
┌─────────────────────────────────────────────────────────────────────┐
│ Determine delay orders between the input variables and the output   │
│ variables by using a dynamic mechanism model, an AIC or BIC, and    │
│ define a dynamic differential regression vector according to the    │
│ delay orders                                                         │
└─────────────────────────────────────────────────────────────────────┘
                                  ↓
┌─────────────────────────────────────────────────────────────────────┐
│ Perform high-dimensional parameter machine learning clustering on   │
│ the basis of the dynamic differential regression vector, divide     │
│ hyperplanes on the basis of a machine learning algorithm according  │
│ to the clustering results, and obtain several scopes according to   │
│ the divided hyperplanes                                              │
└─────────────────────────────────────────────────────────────────────┘
                                  ↓
┌─────────────────────────────────────────────────────────────────────┐
│ Select modeling samples in a balanced manner in each scope,         │
│ establish a global scope dynamic differential input/output          │
│ nonlinear mapping model and a sub-scope dynamic differential        │
│ input/output nonlinear mapping model by using an artificial         │
│ intelligence dynamic regression algorithm, and perform soft         │
│ measurement on the wind speed in front of the wind turbine by means │
│ of receding prediction                                               │
└─────────────────────────────────────────────────────────────────────┘
                                  ↓
┌─────────────────────────────────────────────────────────────────────┐
│ Respectively perform empirical mode decomposition and power         │
│ spectral density analysis on the radar measured wind speed and soft │
│ measured wind speed, and further verify the prediction performance  │
│ of a soft measurement system for wind speed in front of the wind    │
│ turbine                                                              │
└─────────────────────────────────────────────────────────────────────┘
```

FIG. 1

INTELLIGENT SOFT MEASUREMENT METHOD FOR WIND SPEED IN FRONT OF WIND TURBINE

BACKGROUND OF THE INVENTION

1. Field of the Present Invention

The present invention relates to the technical field of wind power generation, in particular to an intelligent soft measurement method for wind speed in front of a wind turbine.

2. Description of Related Art

With the continuous advancement of human society, as an indispensable secondary energy in national production and life, the demand for electricity is increasing. However, with the increasingly severe energy and environmental problems, the gradual transformation of traditional energy forms into new energy has become an inevitable trend in the development of the world today. Among many renewable energy sources, wind energy has attracted widespread attention due to its abundant resources, high efficiency and cleanness.

When a wind turbine is running normally, it is often necessary to accurately acquire the wind speed in front of the wind turbine due to the needs of wind turbine pitch control and output power prediction. At present, there are usually two ways to collect wind speed: the first is to use an anemometer installed above the wind turbine nacelle to measure the wind speed, in which since the anemometer is located at the tail of the wind turbine nacelle and there is a certain distance between the anemometer and a wind rotor, there is a certain delay in the measured wind speed, and due to a wake effect, the wind speed measured at the position behind the wind rotor has frequent changes in size and direction, resulting in a deviation between the wind speed measured by the anemometer at the tail of the nacelle and the wind speed in front of the wind turbine; and the second is to use a laser radar wind measuring device to accurately acquire the effective wind speed in front of the wind turbine, however in which, due to high cost of the laser radar, it is impossible to equip same on each wind turbine in the wind farm.

In order to solve this problem, an intelligent soft measurement method for wind speed in front of a wind turbine is proposed. By using the method, the wind speed in front of a wind turbine can be successfully soft-measured. Input/output nonlinear mapping models are established in different areas on the basis of an idea of dynamic differential scope division, and soft measurement is performed on the wind speed in front of the wind turbine according to the laser radar measured data and the established plurality of nonlinear mapping models. The accurate acquisition of the wind speed in front of a wind turbine can optimize the control performance of a unit and ensure the safe and efficient operation of the unit, and thus the power generation efficiency of the wind turbine is improved.

SUMMARY OF THE INVENTION

In order to solve the above various problems, the present invention provides an intelligent soft measurement method for wind speed in front of a wind turbine, which method reduces the number of equipped laser radar systems and reduces the construction cost of a wind farm.

In order to solve the above technical problems, the technical solution provided by the present invention is: an intelligent soft measurement method for wind speed in front of a wind turbine, including:

selecting a wind turbine, setting a sampling period, and acquiring measured operation data of the wind turbine by using an airborne or ground laser radar system;

selecting, according to aerodynamic characteristic mechanism analysis of the wind turbine, variables such as wind speed measured by the nacelle anemometer as model input variables, and the wind speed in front of the wind turbine as a model output variable;

analyzing the correlation between each input variable and output variable on the basis of a nonlinear feature selection algorithm, and finally determining an input feature variable;

determining delay orders between the input variables and the output variables by using a dynamic mechanism model, an Akaike Information Criterion (AIC for short), or a Bayesian Information Criterion (BIC for short), and defining a dynamic differential regression vector according to the delay order;

performing high-dimensional parameter machine learning clustering on the basis of the dynamic differential regression vector, dividing hyperplanes on the basis of a machine learning algorithm according to the clustering results, and obtaining several scopes according to the divided hyperplanes;

selecting modeling samples in a balanced manner in each scope, establishing a global scope dynamic differential input/output nonlinear mapping model and a sub-scope dynamic differential input/output nonlinear mapping model by using an artificial intelligence dynamic regression algorithm, and performing soft measurement on the wind speed in front of the wind turbine by means of receding prediction;

respectively performing empirical mode decomposition and power spectral density analysis on the radar measured wind speed and soft measured wind speed, comparing the global scope model and sub-scope model, further verifying the estimation performance of the intelligent soft measurement method for wind speed in front of the wind turbine, and selecting the global scope model or the sub-scope model as a final soft measurement model according to the performance of the models.

Preferably, an ultra-short-term sampling is performed on the operation data of the wind turbine by using the airborne or ground laser radar system.

Preferably, in order to verify the correlation between the input and output variables from a data level, a maximum information coefficient (MIC for short) can be used for correlation analysis;

where the MIC calculation formula is:

$$MIC[x, y] = \max_{|X||Y|<B} \frac{I[X;Y]}{\log_2(\min(|X|, |Y|))}. \tag{1}$$

Preferably, judging the delay orders between input and output by using the Akaike information criterion can generally be expressed as:

$$\theta_{AIC}(n_a, n_b) = \frac{2\ln L + 2(n_a + n_b + 1)}{m}, \tag{2}$$

where $n_a$ represents the delay order of the output variables, $n_b$ represents the delay order of the input variables, m represents the number of observations, and L represents the optimal value of a likelihood function obtained by the models.

Preferably, dividing the hyperplanes by using the machine learning algorithm has an optimization objective as follows:

$$\min_{\omega,b,\xi} \frac{1}{2}\|\omega\|^2 + C\sum_{i=1}^{m}\zeta_i \qquad (3)$$
$$\text{s.t. } y_i(\omega^T x_i + b) \geq 1 - \zeta_i,$$
$$\zeta \geq 0, i = 1, 2, \ldots, m$$

where ω and b are respectively a normal vector and an offset of the hyperplanes, and C is a penalty factor and used to control the penalty for misclassified samples, with a value range of (0, 1); $\zeta_i$ is a slack variable; yi is a data classification label, with the value being 1 or −1; and m is the total amount of data used for classification;

by solving the above optimization objective, optimal division hyperplane coefficients of adjacent data sets can be obtained, and each hyperplane divides the entire scope into several sub-scopes; the division of the hyperplanes is to clarify boundaries of each working condition, which facilitates identification of the working conditions and sample sizes of each working condition, and is conducive to model switching and model calling.

Preferably, after the empirical mode decomposition is performed on the radar measured wind speed and model output wind speed, the power spectral density analysis is then performed on an intrinsic mode function (IMF for short), thereby further verifying the performance of effective wind speed estimation, where the empirical mode decomposition is especially suitable for the analysis and processing of nonlinear and non-stationary signals and is a signal decomposition means, and a wind speed signal has the features such as a nonlinear and non-stationary one; the decomposition process comprises: finding all the maximum points of the original data sequence X(t) and fitting the maximum points by using a cubic spline interpolation function to form an upper envelope of the original data; similarly, finding all the minimum points, and fitting the minimum points by using the cubic spline interpolation function to form a lower envelope of the data, where the mean value of the upper and lower envelopes is denoted as mi, the mean envelope mi is subtracted from the original data sequence X(t) to obtain a new data sequence h, and the expression of the new data sequence h is $$h = X(t) - m, \qquad (4)$$

if there are still negative local maxima and positive local minima in the new data after subtracting the envelope mean value from the original data, it means that this is not an empirical mode function, and it is necessary to continue to "screen";

in addition, the power spectral density (PSD for short) is the power carried by each unit frequency wave after the power spectral density of a signal wave is multiplied by an appropriate coefficient; the power spectral density function is an important statistical parameter of frequency characteristics; since the wind speed signal is a random signal, and its integral does not converge, the Fourier transform of the wind speed signal itself does not exist and thus can only be expressed by statistical methods; an autocorrelation function can fully reflect the unique statistical mean value of the signal, and the power spectral density is the Fourier transform of the autocorrelation function, which shows just the power distribution of the signal at each frequency; and by means of the power spectral density analysis, the signal having the maximum power output at a certain frequency can be judged.

Compared with the prior art, the present invention has the advantages that: the wind measurement during the operation of the wind turbine mainly depends on a nacelle anemometer, a wind measuring tower and a laser radar system above the nacelle. The data accuracy acquired by the laser radar system is the highest. But due to the high cost of the laser radar system, in reality, it is impossible to equip every wind turbine with a laser radar system in a wind farm, and only a few wind turbines are equipped with laser radar. Therefore, by means of the existing laser radar data, the soft measurement on the wind speed in front of the wind turbine can be realized on the basis of the intelligent soft measurement method for wind speed in front of a wind turbine, the wind speed model in front of a few wind turbines with lidar can be transferred to other wind turbines without lidar to obtain the wind speed in front of the wind turbine , thereby reducing the number of the laser radar systems, and greatly reducing the construction cost of the wind farm.

The soft measurement of the wind speed in front of a wind turbine can improve the control performance of the wind turbine. Since the wind turbine is in a three-dimensional time-varying wind field environment, the wind speed is distributed differently on the entire rotation plane of the wind turbine, and the wind speed measured by the anemometer is very different from the effective wind speed received by the entire rotation plane of the wind turbine, the wind speed in front of the wind turbine cannot be measured directly. However, this problem can be solved by using an intelligent soft measurement method based on the wind speed in front of a wind turbine, because the wind speed in front of the wind turbine can be indirectly obtained from other measurable data, and has the high accuracy.

The power characteristics of a wind turbine are an important index to evaluate its performance, which directly affects the power generation of the wind turbine. After the wind turbine is in service, it is necessary to evaluate the power characteristics in time, and the key to the evaluation is to accurately acquire the wind speed in front of the wind turbine. Therefore, the present invention has important guiding significance for the power characteristics of wind turbines.

BRIEF DESCRIPTION OF THE DRAWINGS

FIG. 1 is a flowchart of an intelligent soft measurement method for wind speed in front of a wind turbine according to the present invention;

DETAILED DESCRIPTION OF THE PREFERRED EMBODIMENTS

Figure 2:
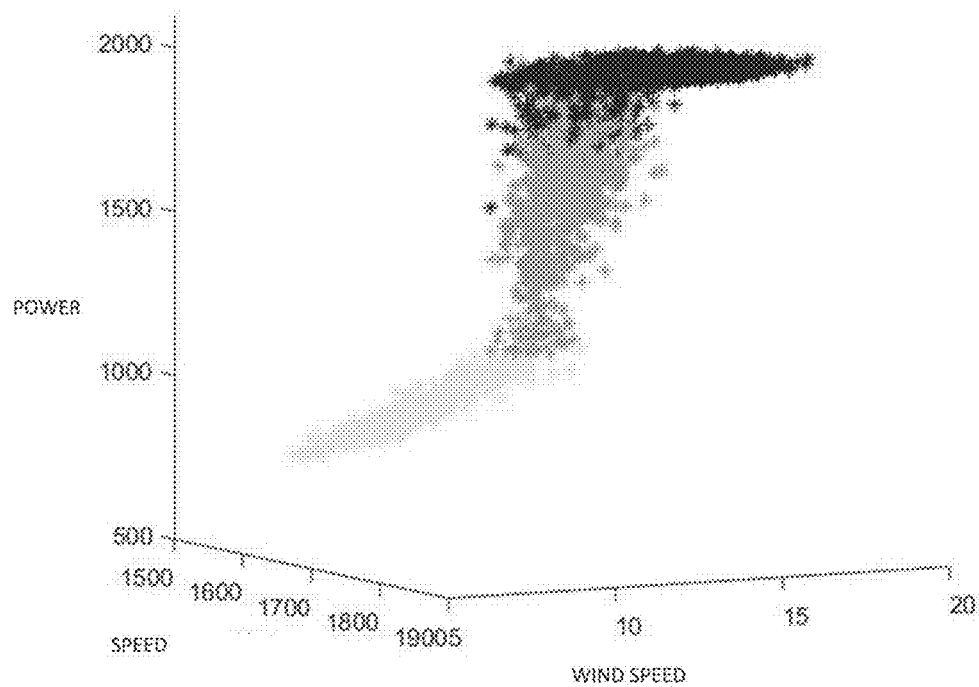
FIG. 2 is a K mean value-hierarchical clustering effect diagram according to the present invention.

In order to make the purpose, technical solutions and advantages of the embodiments of the present invention clearer, the technical solutions of the present invention will be clearly and completely described below in conjunction with the accompanying drawings. Obviously, the described embodiments are part of the embodiments of the present invention, not all of them. Based on the embodiments of the present invention, all the other embodiments obtained by those skilled in the art without making creative efforts belong to the scope of protection of the present invention.

In the following, the technical means adopted by the present invention to achieve the intended purpose of the present invention will be further described in conjunction with the accompanying drawings and preferred embodiments of the present invention. In the present invention, a wind turbine in a wind farm in Yunnan is selected, and a laser radar system is used to acquire measured historical operation data for simulation, and the sampling period is 1 second per point.

Step 1: select a wind turbine, set a sampling period, and acquire measured operation data of the wind turbine by using an airborne or ground laser radar system;

Step 2: select, according to aerodynamic characteristic mechanism analysis of the wind turbine, the wind speed measured by the nacelle anemometer, the generator speed, the active power and a pitch angle as model input variables, and the wind speed in front of the wind turbine as a model output variable;

In the aerodynamic characteristic mechanism analysis of the wind turbine, according to the principle of aerodynamics, the power actually captured by a wind rotor after the wind passes through the wind rotor is:

$$P = \frac{1}{2}\rho\pi R^2 C_p v_q^3, \quad (1)$$

where p is the air density, R is the radius of the wind rotor, $v_q$ is the wind speed in front of the wind turbine, and $C_p$ is a wind energy utilization coefficient, which can be expressed in the form of a nonlinear function between the tip speed ratio $\lambda$ and the pitch angle $\beta$:

$$C_p = f(\lambda, \beta) \quad (2),$$

where the tip speed ratio $\lambda$ is defined as $$\lambda = \frac{R\omega_r}{v},$$

$\omega_r$ being the rotor speed of the wind rotor, and the relationship between the rotor speed of the wind rotor and the generator speed $\omega_g$ is $\omega_g = \alpha\omega_r$, where $\alpha$ is the transmission ratio of a gearbox;

Substitute a tip speed ratio formula $$\lambda = \frac{R\omega_r}{v}$$

to obtain:

$$\lambda = \frac{R\omega_g}{\alpha v}; \quad (3)$$

and ignore the loss on a mechanical side according to the energy conservation law to obtain:

$$P = \frac{1}{2}mv_q^2 - \frac{1}{2}mv_c^2, \quad (4)$$

where m is the mass of gas flowing through, and $v_c$ is the wind speed measured by the nacelle anemometer.

Therefore, the wind speed $v_q$ in front of the wind turbine is related to the generator speed $\omega_g$, the wind speed $v_c$ measured by the nacelle anemometer, the power P and the pitch angle $\beta$, and the wind speed measured by the nacelle anemometer, generator speed, active power and pitch angle are thus selected as model input variables, and the wind speed in front of the wind turbine as a model output variable.

Step 3: analyze the correlation between each input variable and output variable by using a nonlinear correlation analysis algorithm, and finally determine an input feature variable.

In this embodiment, the correlation analysis is performed by using the maximal information coefficient (MIC for short), and the MIC calculation is divided into three steps:

1. Give i and j, perform i-column and j-row gridding on a scatter diagram composed of X and Y, and find the maximum mutual information value;

2. Normalize the maximum mutual information value; and

3. Select the maximum value of mutual information at different scales as an MIC value.

The correlation coefficients between each input variable and output variable are shown in Table 1.

Table 1: table of correlation coefficients between each input variable and output variable

TABLE 1 table of correlation coefficients between each input variable and output variable

| | generator speed: wind speed in front of wind turbine | real-time active power: wind speed in front of wind turbine | wind speed measured by the nacelle anemometer: wind speed in front of wind turbine | pitch angle: wind speed in front of wind turbine |
|---|---|---|---|---|
| MIC value | 0.8385 | 0.8394 | 0.7934 | 0.8125 |

Step 4: determine delay orders between the input variables and the output variables on the basis of a dynamic mechanism model and by using an Akaike Information Criterion (AIC for short), or a Bayesian Information Criterion (BIC for short), and define a dynamic differential regression vector according to the delay orders;

In this embodiment, the AIC criterion is used to determine the delay orders between input and output as na=3 and nb=2, and the dynamic differential regression vector is defined according to the delay orders as:

$$\mu(t)=[g(t-1), g(t-2), P(t-1), P(t-2), v(t-1), v(t-2), p(t-1), p(t-2), y(t-1), y(t-2), y(t-3)] \quad (5)$$

where g(·) is the generator speed, P(·) is the active power, v(·) is the wind speed measured by the nacelle anemometer, p(·) is the pitch angle, and y(·) is the wind speed in front of the wind turbine.

Figure 3:
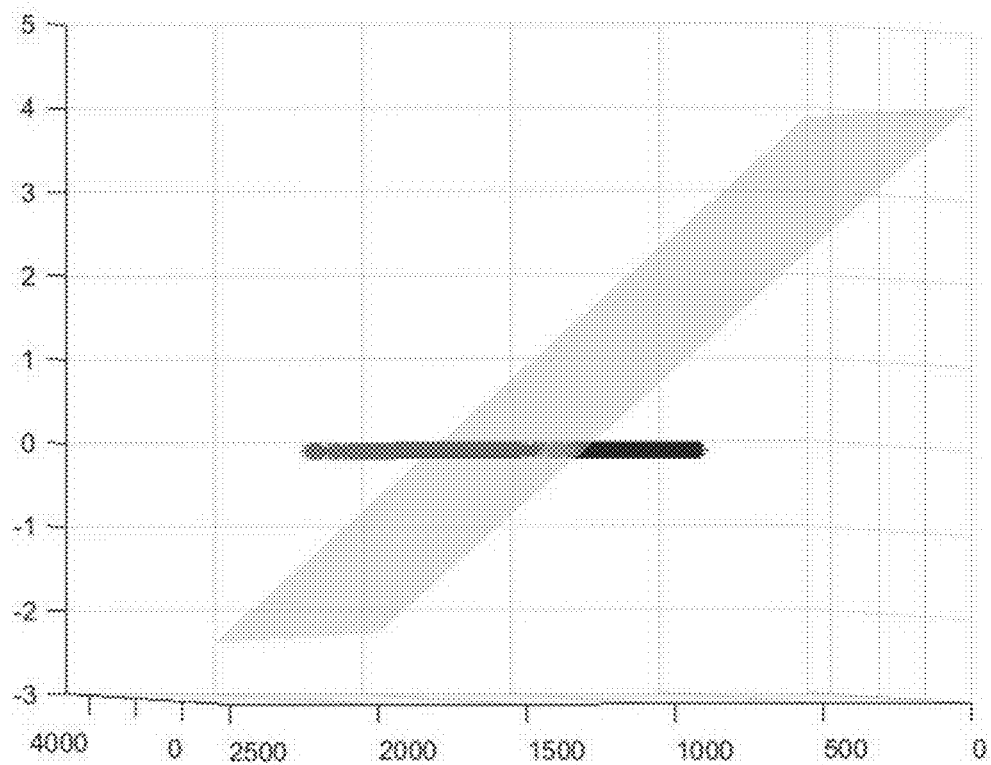
FIG. 3 is a hyperplane display effect diagram according to the present invention.

Step 5: classify the data on the basis of the dynamic differential regression vector by using a high-dimensional parameter machine learning clustering algorithm, divide hyperplanes on the basis of a machine learning algorithm according to the clustering results, and obtain several scopes according to the divided hyperplanes;

In this embodiment, the clustering algorithm uses a K-means-hierarchical clustering algorithm, and the machine learning algorithm uses a soft-margin support vector machine algorithm. The clustering effect is shown in FIG. 2, and the display effect of the divided hyperplanes is shown in FIG. 3.

Figure 4:
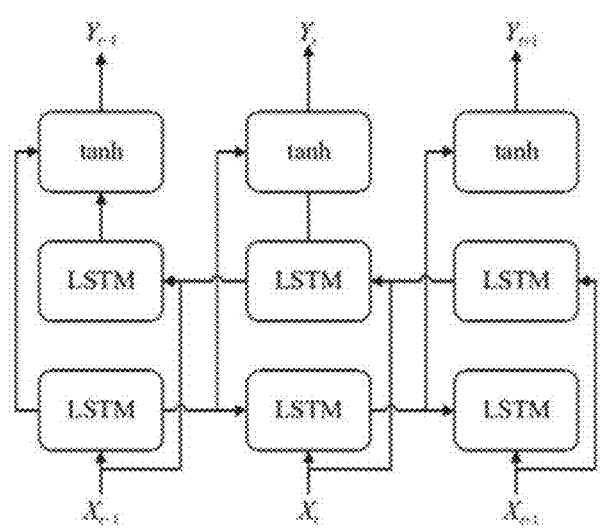
FIG. 4 is a structure diagram of BiLSTM according to the present invention.
Figure 5:
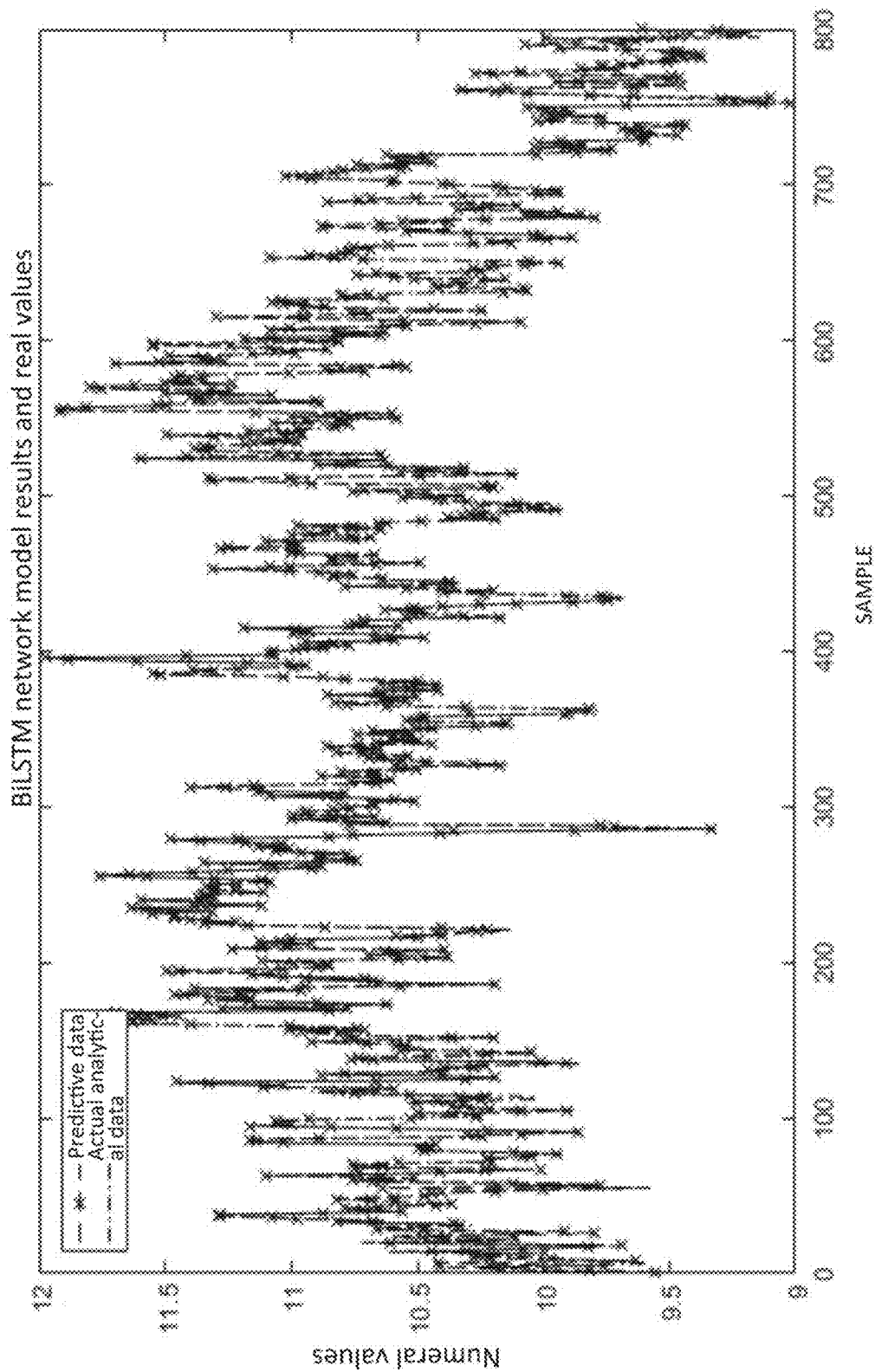
FIG. 5 is an accuracy diagram of an input/output nonlinear mapping model according to the present invention.
Figure 6:
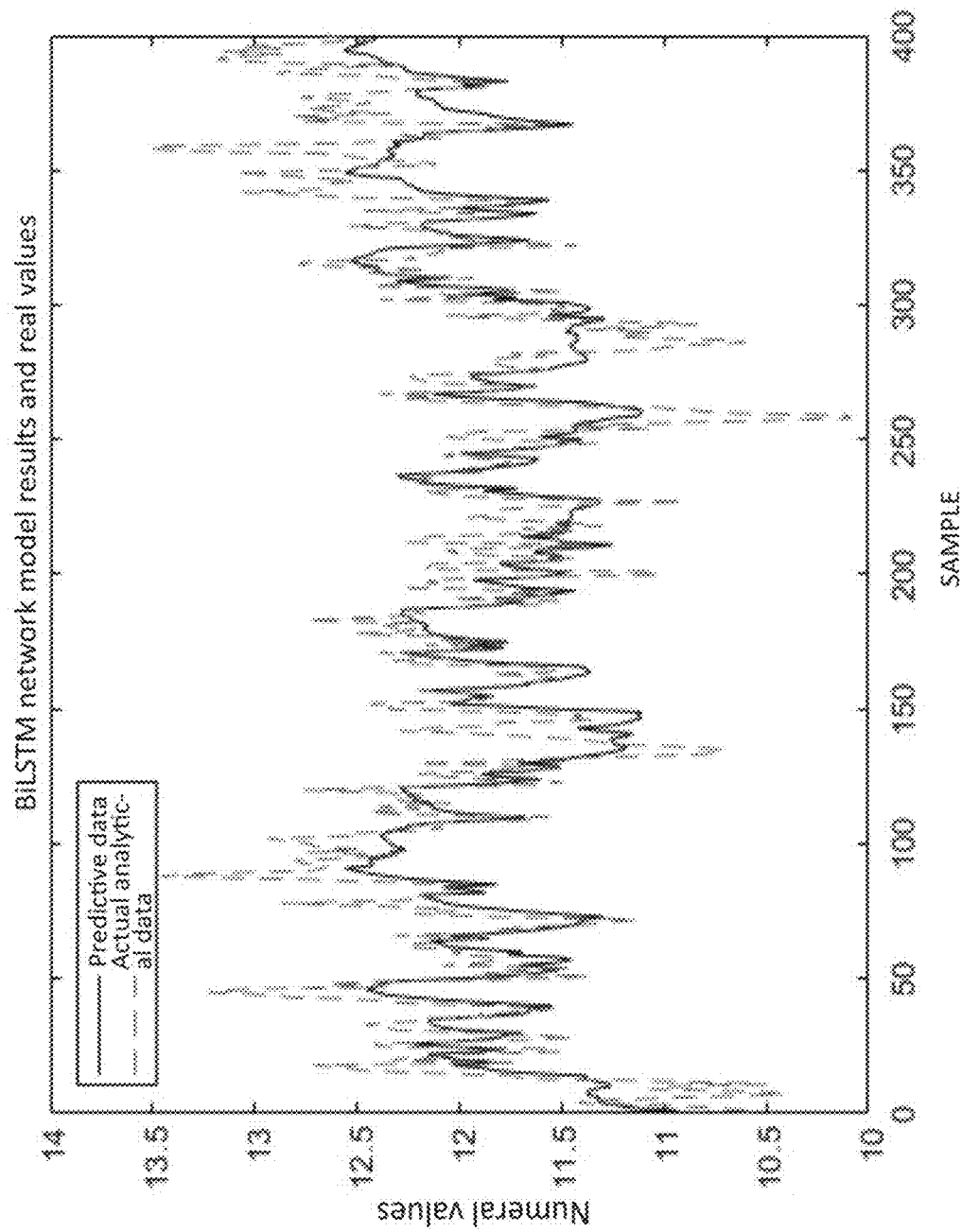
FIG. 6 is a receding prediction effect diagram according to the present invention.

Step 6: select modeling samples in a balanced manner in each scope, respectively establish input/output nonlinear mapping models by using an artificial intelligence dynamic regression algorithm, and on the basis of the nonlinear mapping models in each scope, realize soft measurement on the wind speed in front of the wind turbine by means of receding prediction;

In this embodiment, input/output nonlinear mapping models are established by using a deep learning BiLSTM neural network algorithm, and a bidirectional long short-term memory (Bi-LSTM for short) is composed of forward LSTM and backward LSTM, because the information of an input sequence in both forward and backward directions is combined. For the output at time t, a forward LSTM layer has the information of time t and the previous time in the input sequence, and a backward LSTM layer has the information of time t and the subsequent time in the input sequence. The vectors output by the two LSTM layers can be processed by means of addition, averaging, or concatenation. The Bi-LSTM structure is shown in FIG. 4. The modeling accuracy of the input/output nonlinear mapping model that is established on the basis of one of the scopes is shown in FIG. 5. The effect of soft measurement on the wind speed in front of the wind turbine by means of receding prediction is shown in FIG. 6.

Step 7: respectively perform empirical mode decomposition and power spectral density analysis on the radar measured wind speed and the soft measured wind speed, and further verify the estimation performance of the intelligent soft measurement method for wind speed in front of the wind turbine.

Where the steps of empirical mode decomposition are:

Step 7.1: for a model output radar wind speed sequence $l_p(t)$ and a measured radar wind speed l(t), the measured radar wind speed l(t) is used here for illustration. Find all the maximum points on the wind speed sequence, form a maximum point envelope curve $l_{max}(t)$ by means of a cubic spline interpolation function, and find all the minimum points on the wind speed sequence by using the same method to form a minimum point envelope curve $l_{min}(t)$; the mean value of the minimum point envelope curve and the maximum point envelope curve is donated as a, and a is subtracted from the wind speed sequence l(t) to obtain b(t), which is expressed as:

$$a = \frac{l_{max}(t) + l_{min}(t)}{2} \quad (6)$$

$$b(t)=l(t)-a \quad (7);$$

Step 7.2: regard b(t) as a new signal sequence, and calculate its coefficient $D_k$; the formula for calculating the coefficient $D_k$ is as follows:

$$D_k = \frac{\sum_{t=0}^{m}|b^{k-1}(t) - b^k(t)|^2}{\sum_{t=0}^{T}|b^k(t)|^2}, \quad (8)$$

where m is the number of data in the signal sequence, and $b^{k-1}(t)$ and $b^k(t)$ are b(t) when the $D_k$ coefficient is calculated for the k-1th and kth times.

Determine whether the value of the coefficient $D_k$ is between 0.1 and 0.2, and if not, use b(t) as l(t) and repeat step 7.1, then add 1 to the value of k and execute step 7.2.

Step 7.3: if $D_k$ is between 0.1 and 0.2 after k iterations, obtain an empirical mode function at this time:

$$I_x(t)=b^k(t) \quad (9)$$

where $I_n(t)$ represents the nth empirical mode function.

Calculate the remainder of the nth empirical mode function:

$$\zeta_n(t)=l(t)-I_n(t) \quad (10)$$

Step 7.4: judge whether the $I_n(t)$ function is a monotone function or a constant, if so, it means that the decomposition cannot be continued, and the decomposition ends, and otherwise, set $l(t)=\zeta_n(t)$, repeat steps 7.1 to 7.3, and continue to obtain a new empirical mode function, thus all the empirical mode functions and the remaining items of the empirical mode function obtained from the last decomposition are radar wind speed subsequences.

The technical key point of the present invention is how to construct an intelligent soft measurement method for wind speed in front of a wind turbine, involving: first using laser radar data as a data sample, and determining input variables and output variables by means of aerodynamic characteristic mechanism analysis of the wind turbine; judging delay orders between input and output by using an AIC or BIC criterion, defining a dynamic difference regression vector according to the delay orders, performing high-dimensional parameter machine learning clustering on the basis of the dynamic differential regression vector, dividing hyperplanes by using a machine learning algorithm according to the clustering results, obtaining a plurality of scopes according to the hyperplanes, respectively performing input/output nonlinear mapping modeling in each scope by using an artificial intelligence dynamic regression algorithm, performing receding prediction on the wind speed in front of the wind turbine on the basis of the nonlinear mapping models in each scope, and finally performing empirical mode decomposition and power spectral density analysis on the laser radar measured wind speed in front of the wind turbine and the model output wind speed in front of the wind turbine, thereby further verifying the estimation performance of the wind speed in front of the wind turbine.

Figure 7A:
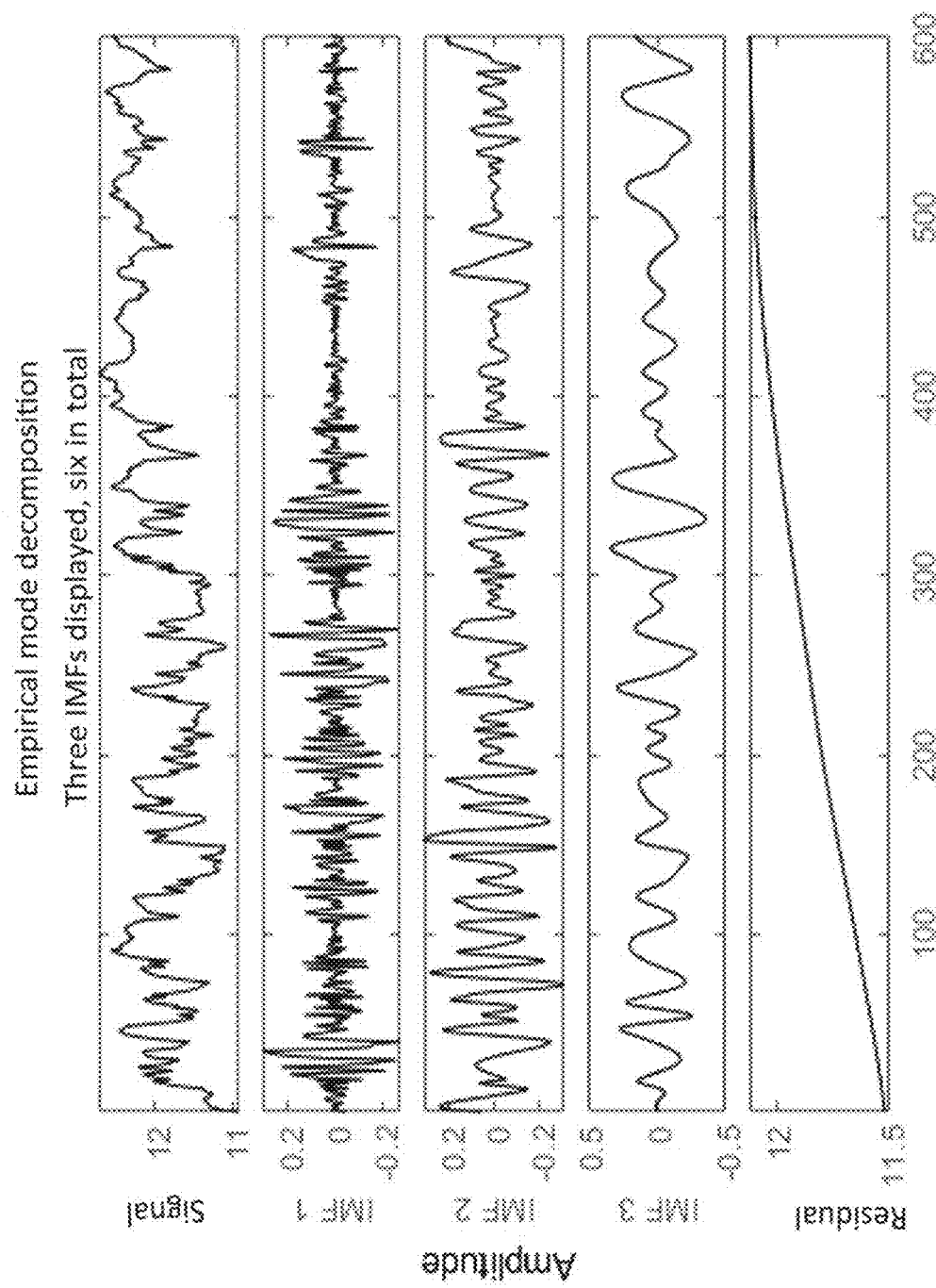
FIG. 7A is EMD decomposition of the wind speed in front of a model output machine and FIG. 7B is EMD decomposition of the wind speed in front of a measuring machine according to the present invention.
Figure 7B:
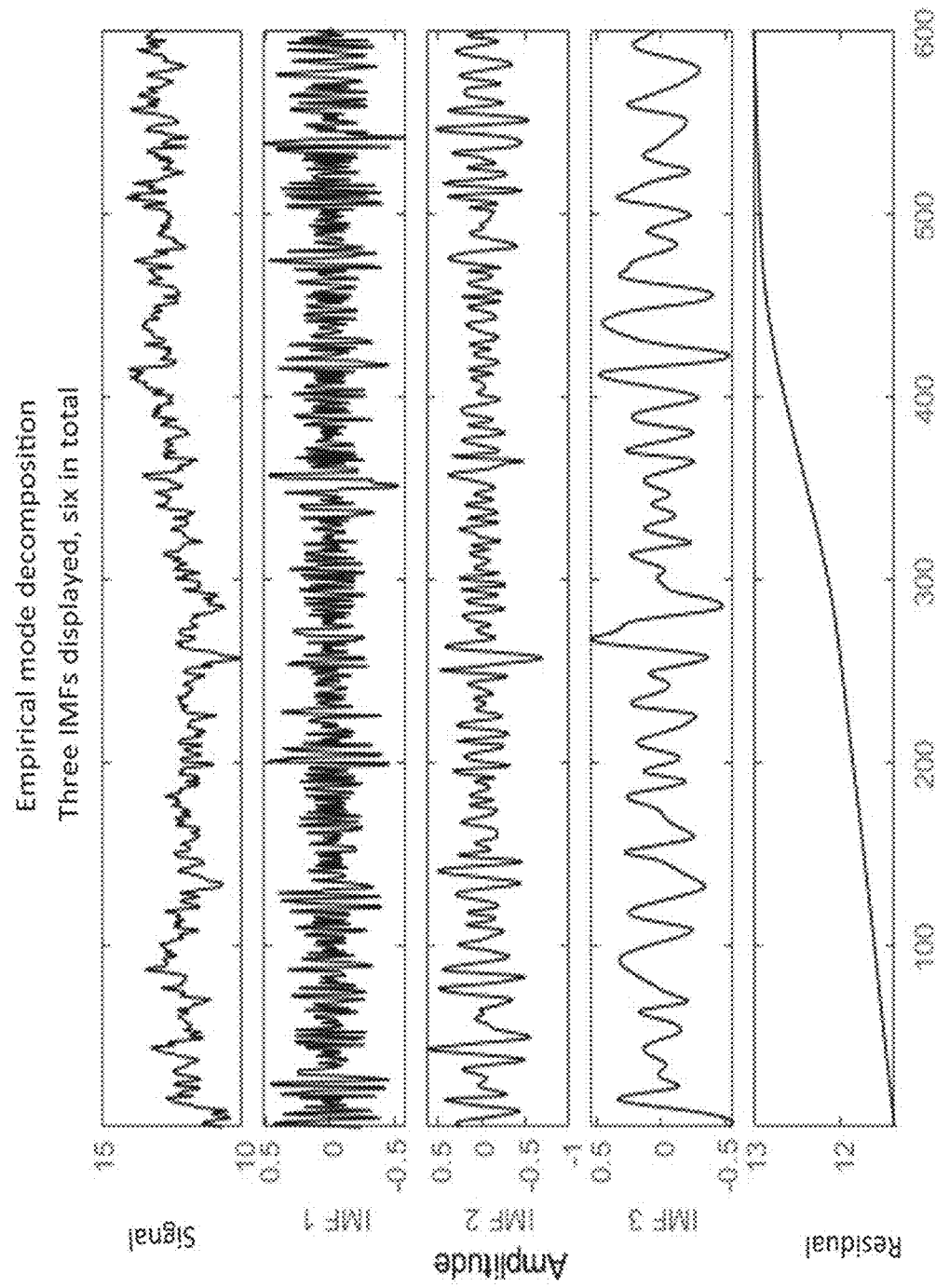
Figure 8:
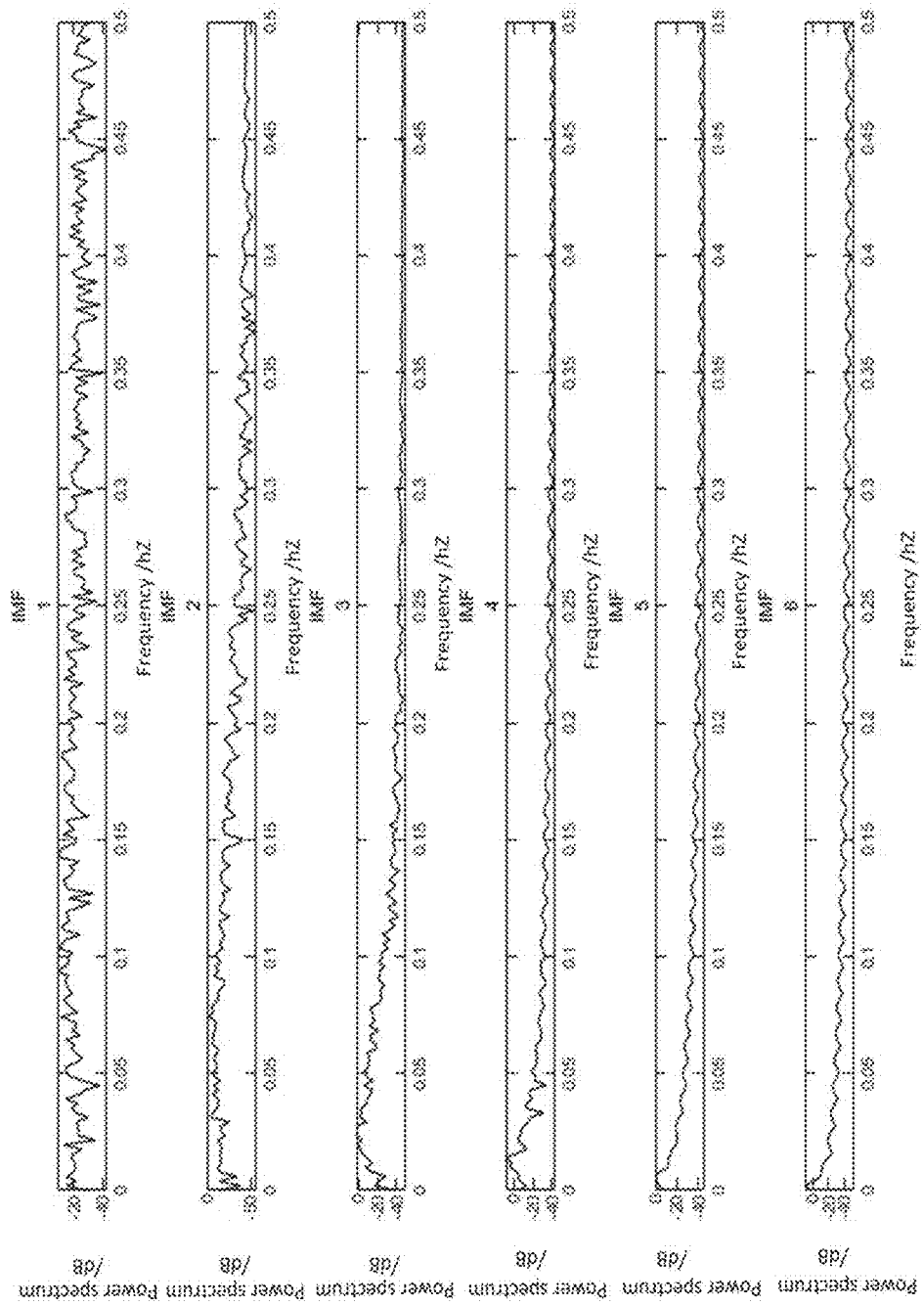
FIG. 8 is a power spectral density diagram of subsequences of the wind speed in front of the model output machine according to the present invention.
Figure 9:
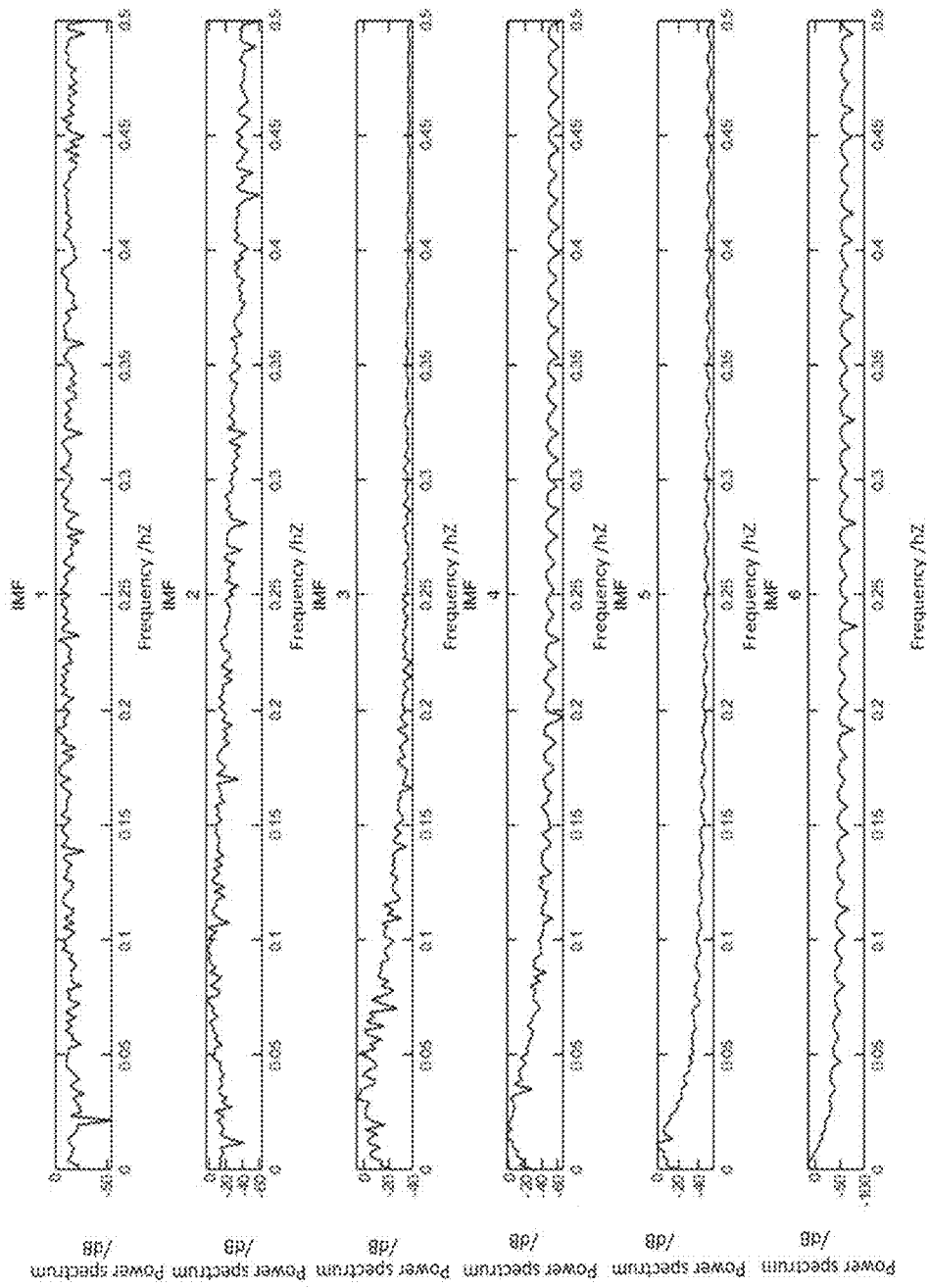
FIG. 9 is a power spectral density diagram of subsequences of the wind speed in front of the measuring machine according to the present invention.

Here, the model output radar wind speed sequence $l_p(t)$ is the same as the empirical mode decomposition process of the measured radar wind speed l(t), and so on, which will not be repeated here. In this embodiment, the model output radar wind speed sequence $l_p(t)$ and the measured radar wind speed l(t) are both decomposed to obtain six wind speed subsequences, as shown in FIGS. 7A and 7B. A power spectral density analysis is then performed on each decomposed wind speed subsequence to find a frequency range of the best soft sensor performance of the wind speed in front of the wind turbine. The power spectral density of the model output radar wind speed subsequence is shown in FIG. 8, and the power spectral density of the measured radar wind speed subsequence is shown in FIG. 9.

The present invention and its embodiments have been described above, and this description is not limited. What is shown in the accompanying drawings is only one of the embodiments of the present invention, and the actual structure is not limited thereto. All in all, a structure and embodiments similar to the technical solution, which are designed by a person of ordinary skill in the art who is inspired thereby without departing from the inventive concept of the present invention and without creativity, shall all fall within the scope of protection of the present invention.

What is claimed is:

1. An intelligent soft measurement method for wind speed in front of a wind turbine, which method is based on wind measurement by a laser radar in front of the wind turbine, short-term or ultra-short-term soft measurement of a wind speed dynamic difference in front of the wind turbine, and time-frequency domain performance evaluation, and comprises:
   selecting a wind turbine, setting a sampling period, and acquiring measured operation data of the wind turbine by using an airborne or ground laser radar system;
   selecting, according to aerodynamic characteristic mechanism analysis of the wind turbine, variables such as the wind speed measured by the nacelle anemometer as model input variables, and the wind speed in front of the wind turbine as a model output variable;
   analyzing the correlation between each input variable and output variable on the basis of a nonlinear feature selection algorithm, and finally determining an input feature variable;
   determining delay orders between the input variables and the output variables by using a dynamic mechanism model, an Akaike Information Criterion (AIC for short), or a Bayesian Information Criterion (BIC for short), and defining a dynamic differential regression vector according to the input and output variables and the delay orders thereof;
   performing high-dimensional parameter machine learning clustering on the basis of the dynamic differential regression vector, dividing hyperplanes on the basis of a machine learning algorithm according to the clustering results, and obtaining several scopes according to the divided hyperplanes;
   selecting modeling samples in a balanced manner in each scope, establishing a global scope dynamic differential input/output nonlinear mapping model and a sub-scope dynamic differential input/output nonlinear mapping model by using an artificial intelligence dynamic regression algorithm, and performing soft measurement on the wind speed in front of the wind turbine by means of receding prediction; and
   respectively performing empirical mode decomposition and power spectral density analysis on the radar measured wind speed and soft measured wind speed, comparing the global scope model and sub-scope model, further verifying the estimation performance of the intelligent soft measurement method for wind speed in front of the wind turbine, and selecting the global scope model or the sub-scope model as a final soft measurement model according to the performance of the models.

2. The intelligent soft measurement method for wind speed in front of a wind turbine according to claim 1, wherein an ultra-short-term sampling is performed on the operation data of the wind turbine by using the airborne or ground laser radar system.

3. The intelligent soft measurement method for wind speed in front of a wind turbine according to claim 1, wherein in order to verify the correlation between the input and output variables from a data level, a maximum information coefficient (MIC for short) can be used for correlation analysis;
   where the MIC calculation formula is:

$$MIC[x, y] = \max_{|X||Y|<B} \frac{I[X;Y]}{\log_2(\min(|X|, |Y|))}. \quad (1)$$

4. The intelligent soft measurement method for wind speed in front of a wind turbine according to claim 1, wherein judging the delay orders between input and output by using the Akaike information criterion can generally be expressed as:

$$\theta_{AIC}(n_a, n_b) = \frac{2\ln L + 2(n_a + n_b + 1)}{m}, \quad (2)$$

where $n_a$ represents the delay order of the output variables, fib represents the delay order of the input variables, m represents the number of observations, and L represents the optimal value of a likelihood function obtained by the models.

5. The intelligent soft measurement method for wind speed in front of a wind turbine according to claim 1, wherein dividing the hyperplanes by using the machine learning algorithm has an optimization objective as follows:

$$\min_{\omega,b,\xi} \frac{1}{2}\|\omega\|^2 + C\sum_{i=1}^{m}\zeta_i \quad (3)$$
$$\text{s.t.} \quad y_i(\omega^T x_i + b) \geq 1 - \zeta_i,$$
$$\zeta \geq 0, i = 1, 2, \ldots, m$$

where ω and b are respectively a normal vector and an offset of the hyperplanes, and C is a penalty factor and used to control the penalty for misclassified samples, with a value range of (0, 1); $\zeta_i$ is a slack variable; $y_i$ is a data classification label, with the value being 1 or −1; and m is the total amount of data used for classification;
   by solving the above optimization objective, optimal division hyperplane coefficients of adjacent data sets can be obtained, and each hyperplane divides the entire scope into several sub-scopes; the division of the hyperplanes is to clarify boundaries of each working condition, which is convenient for identifying the working conditions and sample sizes of each working condition, and is conducive to modeling and model calling.

6. The intelligent soft measurement method for wind speed in front of a wind turbine according to claim 1, wherein after the empirical mode decomposition is performed on the radar measured wind speed and model output wind speed, the power spectral density analysis is then performed on an intrinsic mode function (IMF for short), thereby further verifying the performance of effective wind speed estimation, where the empirical mode decomposition is especially suitable for the analysis and processing of nonlinear and non-stationary signals and is a signal decomposition means, and a wind speed signal has the features such as a nonlinear and non-stationary one; the decomposition process comprises: finding all the maximum points of the original data sequence X(t) and fitting the maximum points by using a cubic spline interpolation function to form an upper envelope of the original data; similarly, finding all the minimum points, and fitting the minimum points by using the cubic spline interpolation function to form a lower envelope of the data, where the mean value of the upper and lower envelopes is denoted as ml, the mean envelope ml is subtracted from the original data sequence X(t) to obtain a new data sequence h, and the expression of the new data sequence h is $$h = X(t) - m_l \quad (4)$$

if there are still negative local maxima and positive local minima in the new data after subtracting the envelope mean value from the original data, it means that this is not an empirical mode function, and it is necessary to continue to "screen";

in addition, the power spectral density (PSD for short) is the power carried by each unit frequency wave after the power spectral density of a signal wave is multiplied by an appropriate coefficient; the power spectral density function is an important statistical parameter of frequency characteristics; since the wind speed signal is a random signal, and its integral does not converge, the Fourier transform of the wind speed signal itself does not exist and thus can only be expressed by statistical methods; an autocorrelation function can fully reflect the unique statistical mean value of the signal, and the power spectral density is the Fourier transform of the autocorrelation function, which shows just the power distribution of the signal at each frequency; and by means of the power spectral density analysis, the frequency at which the signal has the maximum power output can be judged.

* * * * *